United States Patent [19]

Taylor

[11] Patent Number: 4,749,071
[45] Date of Patent: Jun. 7, 1988

[54] FLUID ENERGY ABSORBER DEVICE WITH COMPOSITE PLASTIC CASING

[75] Inventor: Paul H. Taylor, Grand Island, N.Y.

[73] Assignee: Tayco Developments, Inc., North Tonawanda, N.Y.

[21] Appl. No.: 370,740

[22] Filed: Apr. 22, 1982

[51] Int. Cl.⁴ .................... F16F 9/00; F16F 1/36; B27N 5/02

[52] U.S. Cl. .................... 188/322.19; 188/313; 267/148; 428/35

[58] Field of Search .................... 188/322.19, 322.17, 188/322.12, 268, 285, 297, 311, 313, 316, 317; 267/81, 148, 149; 215/DIG. 6; 137/206; 428/35, 36; 138/153, 172; 264/342 RE

[56] References Cited

U.S. PATENT DOCUMENTS

| | | | |
|---|---|---|---|
| 2,497,123 | 2/1950 | Frolich | 428/35 |
| 2,634,799 | 4/1953 | Young | 267/81 |
| 3,002,534 | 10/1961 | Noland | 138/153 X |
| 3,219,333 | 11/1965 | Derschmidt et al. | 267/149 |
| 3,343,833 | 9/1967 | Fader | 188/269 |
| 3,481,369 | 12/1969 | Ganahl | 138/153 X |
| 3,618,928 | 11/1971 | Taylor | 188/317 |
| 3,628,991 | 12/1971 | Thiele et al. | 428/36 |
| 3,631,897 | 1/1972 | Fischer et al. | 138/172 X |
| 3,888,965 | 6/1975 | Kwolek | 264/342 RE |
| 3,970,495 | 7/1976 | Ashton et al. | 428/36 |
| 4,064,977 | 12/1977 | Taylor | 188/268 |
| 4,249,971 | 2/1981 | Yap et al. | 138/153 |
| 4,265,344 | 5/1981 | Taylor | 188/322.19 |

FOREIGN PATENT DOCUMENTS 0223965 1/1959 Australia .................... 267/149

*Primary Examiner*—Andres Kashnikow
*Assistant Examiner*—Robert J. Oberleitner
*Attorney, Agent, or Firm*—Joseph P. Gastel

[57] ABSTRACT

A fluid energy absorber device, such as a fluid spring or shock absorber, or combination of both, having a composite casing, compressible fluid in the composite casing, and a piston in the composite casing, the composite casing including an inner plastic cylinder having an outer surface, and an outer high strength plastic cylinder on the outer surface for reinforcing the inner plastic cylinder, the outer high strength plastic cylinder including fibers of metal or plastic extending longitudinally of the inner cylinder and plastic stretchable fibers extending circumferentially of the inner cylinder so as to permit radial expansion of the inner cylinder to provide a high spring rate as compared to a fluid energy absorber device, such as a fluid spring, having a simple plastic casing, the fibers of the outer cylinder being encased in a resin.

13 Claims, 2 Drawing Sheets

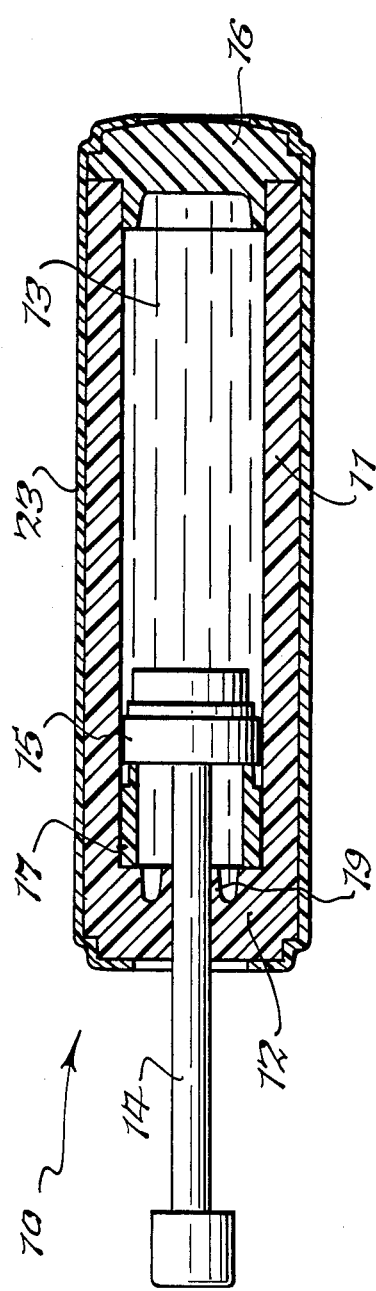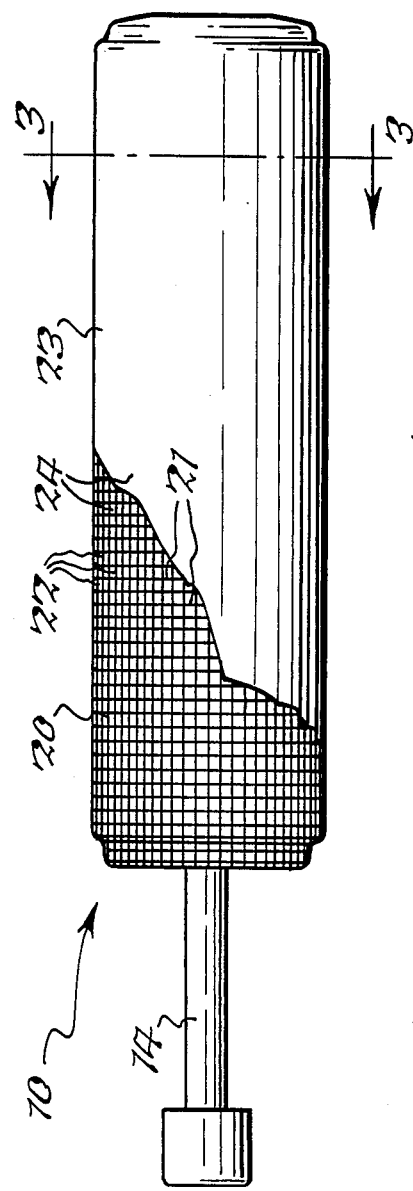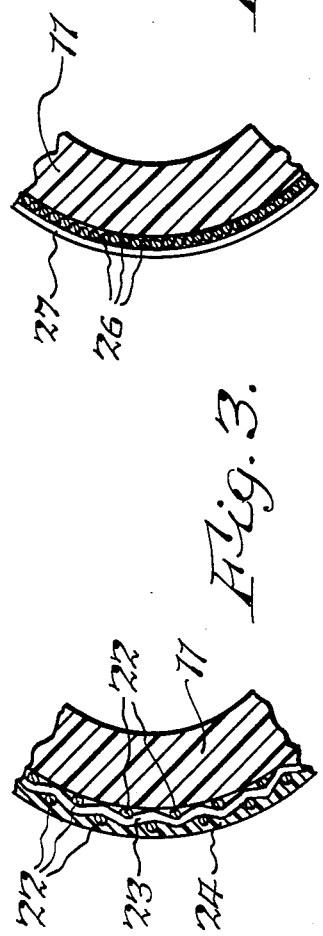

U.S. Patent  Jun. 7, 1988  Sheet 2 of 2  4,749,071
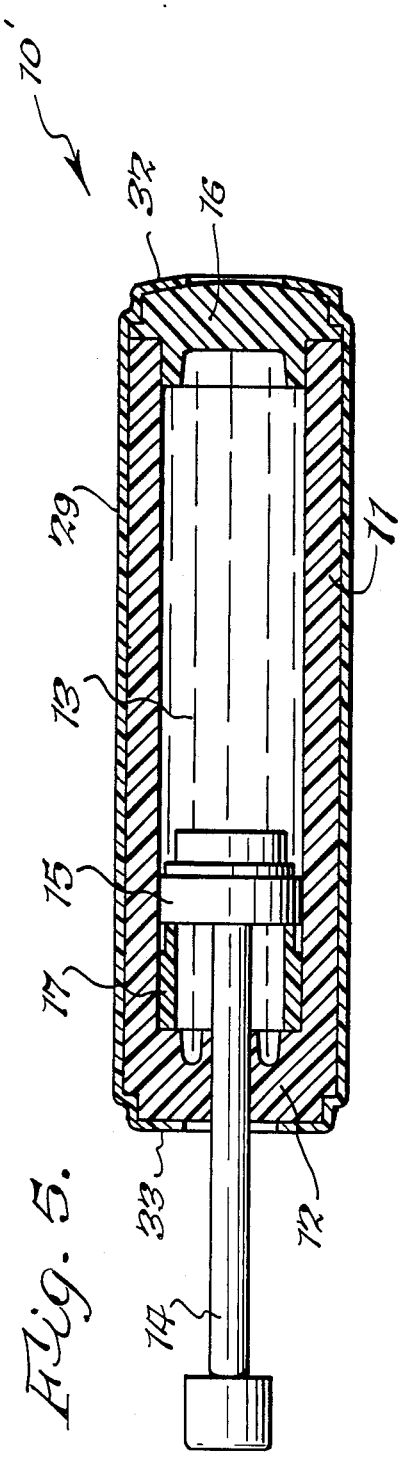
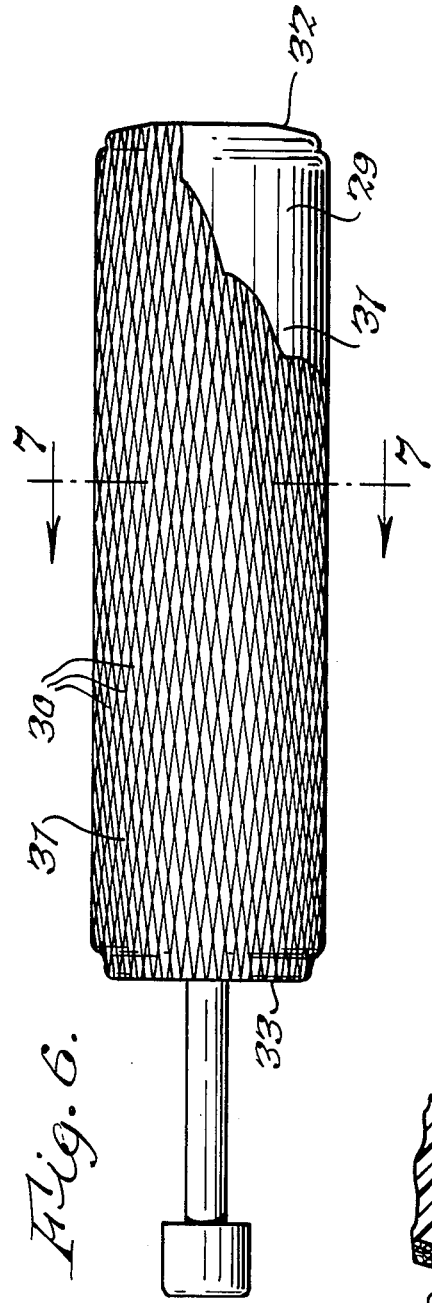
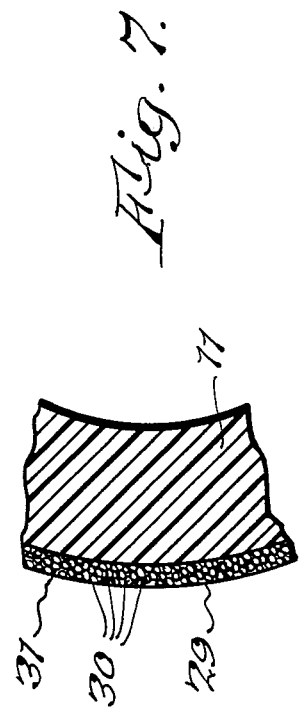

FLUID ENERGY ABSORBER DEVICE WITH COMPOSITE PLASTIC CASING

BACKGROUND OF THE INVENTION

The present invention relates to an improved fluid energy absorber device having a composite plastic casing capable of providing high strength and a high spring rate as compared to an energy absorber device having a plastic casing, and which approaches the performance of a fluid energy absorber device, such as a fluid spring, having a metal casing, without being subject to the effect of temperature variations on the latter.

By way of background, fluid energy absorber devices, such as fluid springs, having metal housings are well known. However, these devices are greatly influenced by variations in temperature because of the different coefficients of thermal expansion of the compressible fluid and the metal cylinder. Furthermore, prior fluid energy absorber devices which were made to withstand heavy loading were relatively heavy because they required a thick metal casing.

In the past various attempts were made to lighten fluid energy absorber devices and overcome thermal effects, and such attempts are disclosed in U.S. Pat. Nos. 3,618,928 and 4,265,344. However, these patents were incapable of functioning in the same manner as the device of the present invention because they could not provide a high spring rate and high energy storage to accompany their light weight and thermal responsiveness.

SUMMARY OF THE INVENTION

It is accordingly the object of the present invention to provide an improved fluid energy absorber device, such as a fluid spring, having a composite plastic casing and having a low weight and high strength and being capable of providing a high spring rate as compared to the spring rate of a fluid spring having a simple plastic casing in addition to providing relatively uniform performance under varying temperature conditions. Other objects and attendant advantages of the present invention will readily be perceived hereafter.

The present invention relates to a fluid energy absorber device comprising a composite casing, compressible fluid in said composite casing, and a piston in said composite casing, said composite casing comprising an inner plastic cylinder having an outer surface, and an outer plastic cylinder of greater strength than said inner plastic cylinder on said outer surface for reinforcing said inner plastic cylinder.

The present invention also relates to a composite casing for a fluid energy absorber device comprising an inner plastic cylinder having an outer surface, and a high strength plastic outer cylinder on said outer surface for reinforcing said inner plastic cylinder. The various aspects of the present invention will be more fully understood when the following portions of the specification are read in conjunction with the accompanying drawings wherein:

BRIEF DESCRIPTION OF THE DRAWINGS

FIG. 1 is a cross sectional view of the improved fluid energy absorber device of the present invention;

FIG. 2 is a side elevational view of the device of FIG. 1 with a portion of the outer cylinder broken away;

FIG. 3 is an enlarged fragmentary cross sectional view taken substantially along line 3—3 of FIG. 2;

FIG. 4 is a fragmentary cross sectional view similar to FIG. 3 but showing another embodiment of the present invention;

FIG. 5 is a cross sectional view of a still further embodiment of the present invention;

FIG. 6 is a side elevational view of the embodiment of FIG. 5 with a portion of the outer cylinder broken away; and FIG. 7 is a fragmentary cross sectional view taken substantially along line 7—7 of FIG. 6.

DESCRIPTION OF THE PREFERRED EMBODIMENTS

The improved fluid energy absorber device is shown at 10 of FIG. 1. The fluid energy absorber device 10 may be a fluid spring or a fluid shock absorber, or a combination of both, and the fluid utilized therein may be a liquid or a gas or a combination of both. Accordingly, the description "fluid energy absorber device" will encompass all of the foregoing.

Fluid energy absorber device 10 includes an inner molded plastic cylinder 11 with the plunger end 12 molded integrally therewith. Fluid energy absorber device 10, which in this instance is portrayed as a liquid spring, contains compressible liquid 13, such as a silicone liquid, within cylinder 11, and a piston 14 extends through end 12 of cylinder 11. A fluid dampening head 15 is mounted at the end of piston 14. An end cap 16 is suitably secured in cylinder 11, as by welding or spinning. An annular sleeve 17 is inserted within cylinder 11 and acts as a stop for dampening head 15. Essentially the portion of the improved liquid spring described to this point may be identical to the liquid spring disclosed in U.S. Pat. No. 4,265,344, which is incorporated herein by reference. The inner cylinder 11 and its associated end cap 16 may be fabricated of a suitable high strength plastic, such as nylon or Delrin and is formed with a seal 19 integral therewith, as described in the aforementioned patent.

A suitable cloth 20 (FIG. 2) is wound around inner cylinder 11. This cloth includes circumferentially extending fibers 21 (FIG. 3) which are woven in and out of longitudinally extending fibers 22. The circumferentially extending fibers are preferably fabricated from an aramid, such as Kevlar, and the longitudinal fibers 22 may be graphite, steel, aluminum, titanium, boron, or other suitable materials having a high stiffness. This construction will provide a high columnar strength because of the longitudinal fibers 22, but will permit radial expansion of the inner cylinder 11 because of the stretchability of the circumferential fibers 21. Thus, the stretchable circumferential fibers will be able to cause the composite cylinder to have a high spring rate as compared to the spring rate of a liquid spring having a simple plastic casing. The higher spring rate is due to the lower elasticity of the material as compared to the plastic which was previously used. In addition, the plastic fibers 21 and the plastic inner cylinder 11 have a thermal coefficient of expansion which is much closer to that of the compressible liquid 13, which may be a silicone, than steel so that there will be an inherent thermal compensation in the composite casing 23. This essentially means that piston 14 will not be moved in and out of cylinder 11 with changes in ambient temperature. Notwithstanding the ability of liquid spring 10 to compensate for changes in the ambient temperature, it will still have a relatively high columnar strength because of the existence of the high strength stiff longitudinal fibers 22. The fibers 21 and 22 are encased in a suitable resin 24, which may be an epoxy resin or any other suitable resin.

In FIG. 4 a modified embodiment of the present invention is disclosed. The inner cylinder 11 is identical to the cylinder of FIG. 1. However, instead of using a cloth, such as 20 described above relative to FIG. 2, the outer cylinder 25 consists of a plurality of longitudinally extending fibers 26 in side-by-side relationship which are surrounded by a circumferentially extending fiber 27 of suitable plastic, such as aramid. Turns of fiber 27 may be separated from each other and extend in an helical pattern. Suitable resin, such as an epoxy resin, encases the fibers 26 and 27. The embodiment of FIG. 4 has the same capabilities as the embodiment of FIGS. 1-3.

In FIG. 5 a modified embodiment 10' of the present invention is shown. This embodiment includes an inner cylinder which may be identical in all respects to that disclosed in FIG. 1 and accordingly the inner cylinder will bear the same numerals. The embodiment of FIG. 5 is shown in greater detail in FIG. 6. It includes an outer cylinder 29 consisting of fibers 30 which are woven in a diagonal pattern and encased in resin 31. These fibers are preferably aramid but can be of any other suitable material. The fibers of threads are wound around the ends of the inner cylinder as at 32 and 33 to limit longitudinal expansion and the resistance to such longitudinal expansion will be determined by the angle of the threads to the longitudinal axis of the cylinder, that is, the more nearly parallel the threads to the longitudinal axis, the greater will be the resistance to longitudinal stretch. Conversely, the more nearly perpendicular the threads to the longitudinal axis of the cylinder, the less will be the resistance to longitudinal stretch and the greater will be the resistance to circumferential stretch.

The above construction provides a low cost molded plastic cylinder which is reinforced externally to take heavy columnar loading, yet the cylinder is relatively lightweight and relatively inexpensive because it can be formed by molding. If desired, the outer cloth which forms a part of the outer cylinder can be prestressed to provide the desired resistance to expansion of the liquid spring in a radial direction.

It will be appreciated that in all the embodiments the specific characteristics of the liquid spring can be changed by the proper selection of the material with which the plastic inner cylinder 11 is wound. Also, as noted above, by selecting the obliqueness of the angle of wind of the threads in the embodiment of FIGS. 6 and 7, the ratio of longitudinal to circumferential stretch may be predetermined.

While the specific examples discussed above have been liquid springs, it will be appreciated, as stated previously, that the principles of the present invention are applicable to all types of fluid energy absorber devices, which are defined as fluid springs or fluid shock absorbers, or a combination of both, containing either a liquid or a gas, or a combination of both.

While preferred embodiments of the present invention have been disclosed, it will be appreciated that it is not limited thereto, but may be otherwise embodied within the scope of the following claims.

What is claimed is:

1. A fluid energy absorber device comprising a composite casing, fluid in said composite casing, and a piston in said composite casing having a predetermined direction of travel, said casing having a longitudinal axis which is oriented in said direction of travel of said piston, said composite casing comprising an inner plastic cylinder having an outer surface, and an outer plastic cylinder of greater strength than said inner plastic cylinder on said outer surface for reinforcing said inner plastic cylinder, said outer plastic cylinder including fibers of high stiffness encased therein which extend longitudinally of said longitudinal axis of said casing to provide high columnar strength to said casing.

2. A fluid energy absorber device as set forth in claim 1 wherein said outer plastic cylinder also includes high strength stretchable fibers encased therein which extend circumferentially of said casing to provide a higher spring rate to said casing than if said high strength stretchable fibers were not present.

3. A fluid energya bsorber device as set forth in claim 2 wherein said high strength stretchable fibers are aramid fibers.

4. A fluid energy absorber device as set forth in claim 2 wherein said high strength stretchable fibers are prestressed.

5. A fluid energy absorber device as set forth in claim 2 wherein said fibers of high stiffness and said high strength stretchable fibers are woven into a cloth.

6. A fluid energy absorber device as set forth in claim 5 wherein said cloth is prestressed to provide resistance to expansion of said casing in a radial direction.

7. A fluid energy absorber device as set forth in claim 1 wherein said longitudinally extending fibers are oriented in side-by-side relationship, and wherein said high strength stretchable fibers surround said longitudinally extending fibers.

8. A fluid energy absorber device as set forth in claim 1 wherein said fibers of high stiffness are selected from the group of graphite, steel, aluminum, titanium and boron.

9. A fluid energy absorber device as set forth in claim 3 wherein said outer plastic cylinder also includes high strength stretchable fibers engaged therein which extend circumferentially of said casing to provide a higher spring rate to said casing than if said high strength stretchable fibers were not present.

10. A fluid energy absorber device as set forth in claim 6 wherein said high strength stretchable fibers are aramid fibers.

11. A fluid energy absorber device as set forth in claim 1 wherein said inner plastic cylinder has first opposite ends, and wherein said outer plastic cylinder has second opposite ends which overlie said first opposite ends.

12. A fluid energy absorber device comprising a composite casing, fluid in said composite casing, and a piston in said composite casing, said composite casing comprising an inner plastic cylinder having an outer surface and opposite ends, and an outer plastic cylinder of greater strength than said inner plastic cylinder on said outer surface for reinforcing said inner plastic cylinder, and high strength fibers oriented in a diagonal crisscross pattern encased in said outer plastic cylinder, said high strength fibers also extending around said ends of said inner plastic cylinder to limit longitudinal expansion of said inner plastic cylinder.

13. A fluid energy absorber device as set forth in claim 12 wherein said high strength fibers are aramid fibers.

* * * * *

UNITED STATES PATENT AND TRADEMARK OFFICE
CERTIFICATE OF CORRECTION

PATENT NO. : 4,749,071

DATED : June 7, 1988

INVENTOR(S) : Paul H. Taylor

It is certified that error appears in the above-identified patent and that said Letters Patent is hereby corrected as shown below:

Column 2, line 40, after "described" insert --in detail--.

Column 4, line 18 (claim 3), change "energya bsorber" to --energy absorber--.

Column 4, line 31 (claim 7), change "1" to --2--.

Column 4, line 40 (claim 9), change "3" to --8--.

Column 4, line 46 (claim 10), change "6" to --9--.

Signed and Sealed this

Eleventh Day of October, 1988

Attest:

DONALD J. QUIGG

Attesting Officer

Commissioner of Patents and Trademarks